J. W. KROEZE.
PANEL SANDING MACHINE.
APPLICATION FILED DEC. 27, 1910.
998,351.
Patented July 18, 1911.
2 SHEETS—SHEET 2.
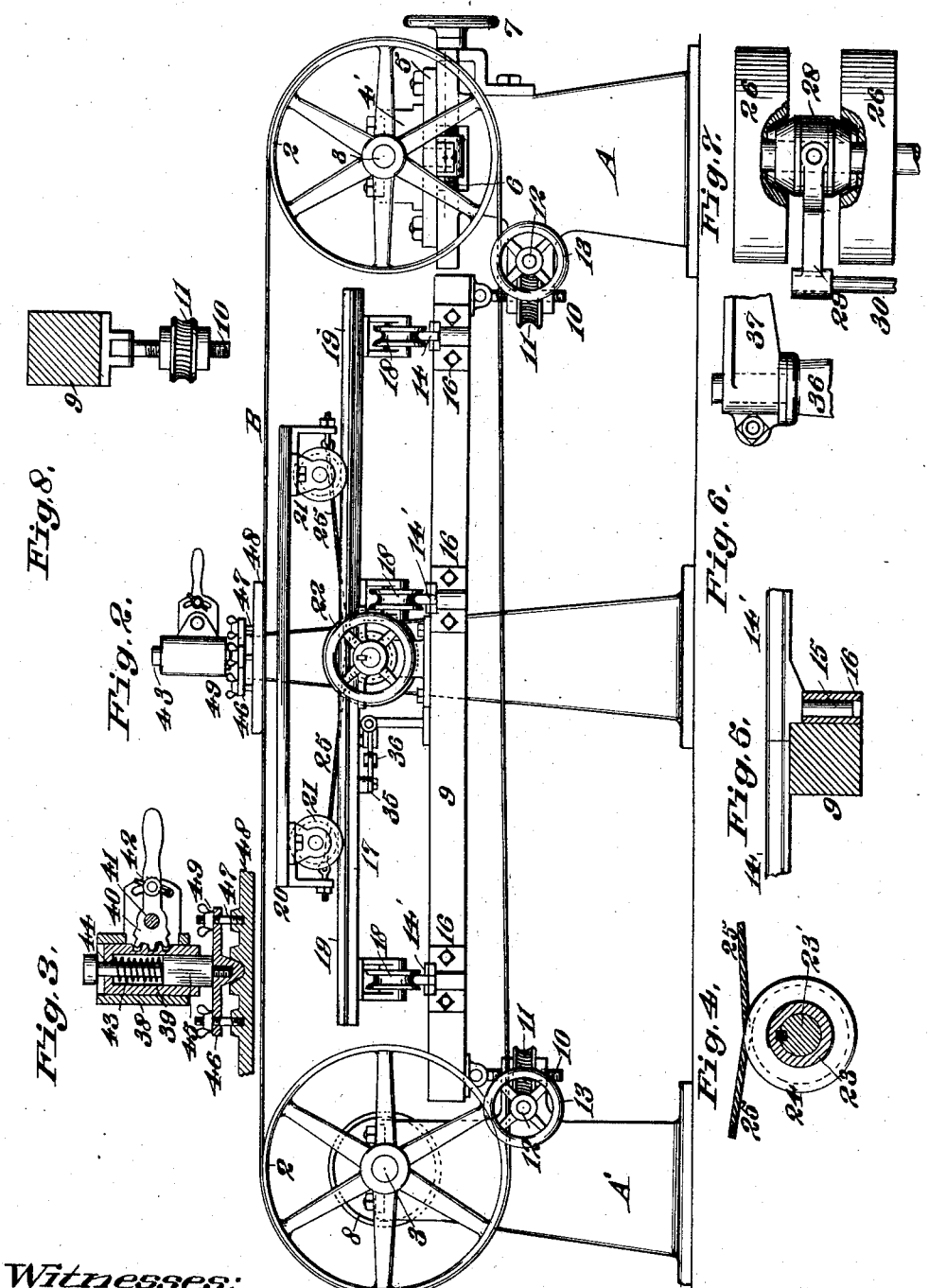
Witnesses:
Inventor:
John W. Kroeze,
By Geo. H. Strong.
Atty

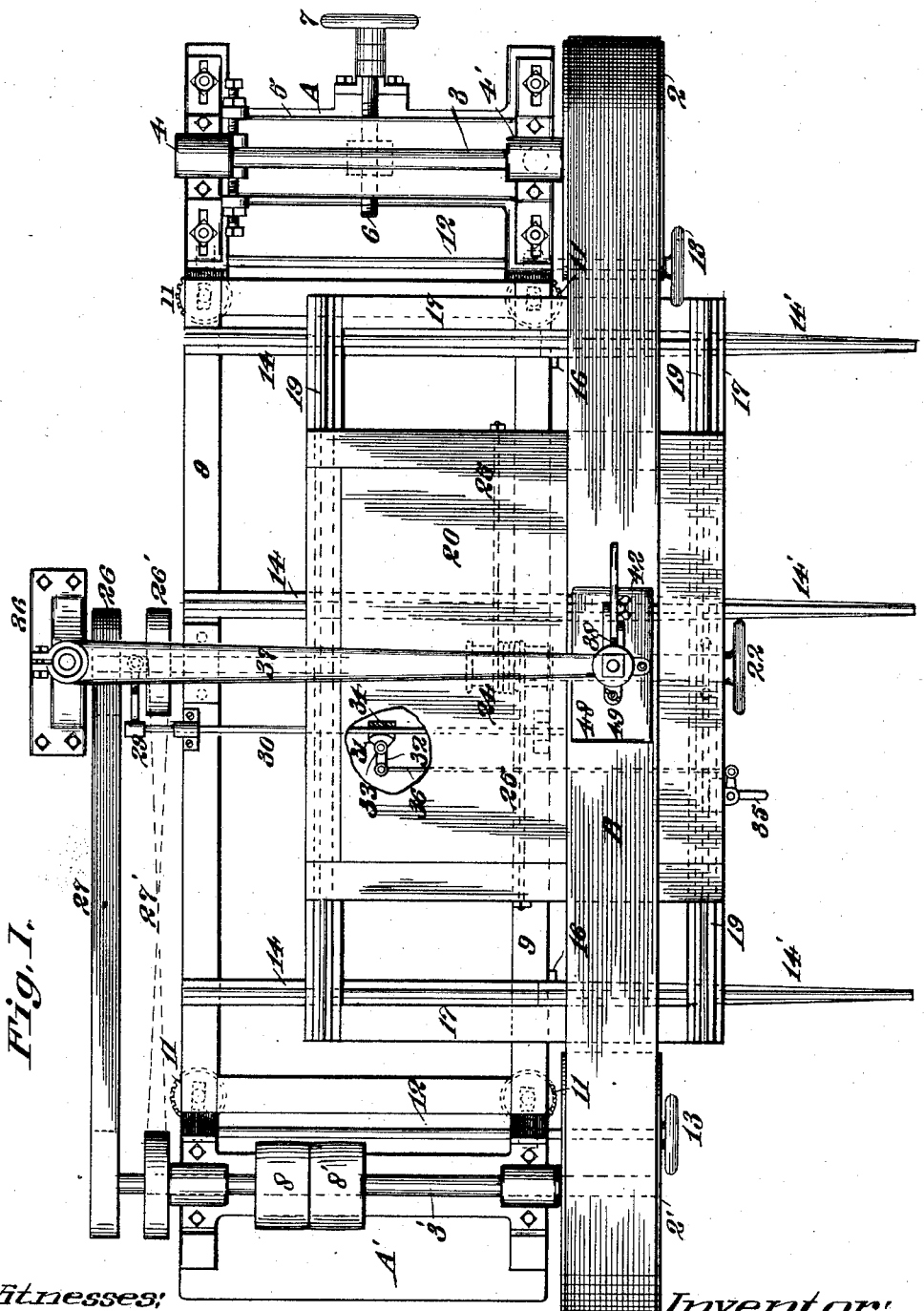

UNITED STATES PATENT OFFICE.

JOHN W. KROEZE, OF BURLINGAME, CALIFORNIA.

PANEL-SANDING MACHINE.

998,351.

Specification of Letters Patent. Patented July 18, 1911.

Application filed December 27, 1910. Serial No. 599,506.

*To all whom it may concern:*

Be it known that I, JOHN W. KROEZE, citizen of the United States, residing at Burlingame, in the county of San Mateo and State of California, have invented new and useful Improvements in Panel-Sanding Machines, of which the following is a specification.

This invention relates to a sanding machine such as is employed in the surfacing of lumber.

It is the object of this invention to provide a sanding machine which is particularly adapted for use in handling and finishing lumber that has been cut into boards, planks, panels or other flat shapes.

A further object is to provide a sanding machine to which flat lumber may be fed and sanded on its upper surface to any desired degree and which is so constructed as to permit of the lumber being shifted beneath the sanding mechanism to enable the operator to finish the surface of a plank or board throughout its length and breadth.

A further object is to provide a sanding machine which is simple in construction and operation, compact, and which is economical in manufacture and maintenance.

The invention consists of the parts and the construction and combination of parts as hereinafter more fully described and claimed having reference to the accompanying drawings, in which—

Figure 1 is a plan view of the invention. Fig. 2 is a side elevation of same. Fig. 3 is a detail in section of the belt-shoe shifting mechanism. Fig. 4 is a detail of a carriage shifting device. Fig. 5 is a detail of the sectional track. Fig. 6 is a detail showing the manner of mounting of the shoe supporting arm. Fig. 7 is a detail in plan with parts broken away, of the clutch mechanism. Fig. 8 is a detail of the device for adjusting the sub-frame.

In the drawings A—A' represents a pair of separated frame members which may be of any suitable character and construction. Rotatably mounted on each of the frame members A—A' is a pulley wheel 2—2' around which an endless sanding belt B is adapted to travel; this belt B being composed of a suitable fabric having an abrasive substance on its under surface.

The pulley 2 is mounted on a shaft 3 extending through adjustable bearing blocks 4—4' which in turn are supported upon a movable frame 5, slidable in suitable bearings on the frame A and adapted to be adjusted thereon by means of a horizontally disposed threaded screw 6 mounted in a threaded bearing on the frame A. This screw 6 is provided with a hand wheel 7 on its outer end by means of which the screw 6 may be rotated so as to move the slidable plate 5 backward or forward on its mountings in the frame A to move the pulley wheel 2 in such manner as to adjust the tension of the abrasive belt B. The bearings 4—4' are adjustable on the plate 5 so as to permit of the shaft 3 being aligned to adjust the pulley 2 that the true travel of the belt B over the pulleys 2—2' will be insured. The pulley 2' is mounted on a drive shaft 3' revolubly mounted in fixed bearings on the frame A'. The shaft 3' is rotated from any suitable source of power through a pulley 8 which is keyed on the shaft, an idler pulley 8' being provided to which the driving belt (not shown) may be shifted in the manner and for the purpose commonly employed in driving mechanism.

The pulleys 2—2' are designed to be spaced at a considerable distance apart to obtain a long span of the sanding or abrasive belt B, which span will be varied in different machines to suit the length of the material to be handled. Supported upon the frames A—A' and horizontally disposed therebetween is a vertically adjustable rectangular sub-frame 9. A downwardly extending threaded bolt 10 on each corner of the sub-frame 9 is screwed into a revoluble nut 11 mounted between brackets on the frames A—A'. A shaft 12 is mounted on each frame A—A' and each shaft 12 carries a pair of worm gears which mesh with teeth formed on the outer perimeters of the nuts 11. The shafts 12 are rotated by means of hand wheels 13, so as to revolve the nuts 11 in their bearings to cause the bolts 10 to move up or down so as to raise or lower the sub-frame 9. The bolts 10 are hingedly connected to the sub-frame 9 to admit of a certain rocking movement at that point which permits either end of the sub-frame being raised or lowered independent of the other.

Mounted on the upper face of the sub-frame 9 and transverse thereto, are a number of track rails 14 which extend the full width thereof. These tracks may be extended some distance forward of the sub-frame 9 as shown in Fig. 1, the projecting portions of the tracks being formed of separate rails 14' which are designed to be attached to or removed from the sub-frame 9 as desired. Each rail 14' is provided with a downwardly extending pin 15 on its inner end which is adapted to be inserted in a socket 16 on the sub-frame 9, the inner end of the rail 14' being squared to abut against the outer end of the rail 14 to prevent the rail 14' being turned from side to side on the sub-frame 9.

A movable carriage 17 provided with rollers 18 is mounted on the track 14 and is designed to be moved backward and forward laterally across the sub-frame 9 under the upper strand of the belt B. This carriage 17 carries track rails 19 extending longitudinally thereon, on which a table 20, having rollers 21 is mounted and adapted to be moved backward and forward, parallel with the belt B. This table 20 is moved by means of a hand wheel 22 which rotates a hollow shaft or sleeve 23, mounted on the carriage 17, on which a drum 24 is securely mounted; a cable 25 wound on the drum 24 having its terminals extending in opposite directions and attached to the ends of the table 20 in such manner that as the drum 24 revolves one portion of the cable will be wound thereon as another portion unwinds, thus causing the table 20 to move along the carriage 17.

From the foregoing it will be seen that the table 20 may be moved into any position desired beneath the belt B, longitudinal adjustment being obtained by operating the hand wheel 22, lateral adjustment by moving the carriage 17 on the sub-frame 9, and the horizontal plane of the table 20 being adjusted by the hand wheels 13 by which the sub-frame 9 is raised or lowered. The latter adjustment permits of the distance separating the table 20 from the upper strand of the belt B being regulated, as desired.

Means are provided by which the table 20 may operate mechanically, that is, driven by power. This is accomplished by mounting a pair of loose pulleys 26—26' on the outer end of a shaft 23' which extends into and is feathered to the hollow shaft 23, the pulley 26 is rotated by a straight belt 27 from the drive shaft 3' and the other pulley 26' is rotated in the opposite direction through a cross belt 27', indicated in dotted lines in Fig. 1. Disposed between the pulleys 26—26' and keyed on the shaft 23' is a double faced cone clutch 28 which is adapted to be thrown into engagement with either of the pulleys 26—26', or be retained in an intermediate position out of contact with both pulleys, as shown in Fig. 7. The clutch 28 is adapted to be reciprocated on the shaft 23' by means of a yoke 29 on a rod 30, which rod in turn reciprocates by means of a grip or clamp. This clamp consists of a segment 31 formed on a lever 32 pivoted at 33, to the carriage 17; the segment being disposed adjacent the rod 30 and when in its central position just out of contact therewith. The central portion of the face of the segment is flattened adjacent the rod 30, which admits of it being so disposed in relation to the rod 30 that when it is rocked on the pivot 33 the curved portion of the segment will be caused to contact the bar 30 and press the latter against a guide 34 on the carriage 17, thus gripping the rod and causing it to move with the segment to operate the clutch 28. The lever 32 is operated by means of a lever 35 mounted on the carriage 17 and connected to the lever 32 by means of a rod 36. From the foregoing it will be seen that when the segment clutch 31 is out of engagement with the rod 30 that it will ride freely on the rod 30 as the carriage 17 is moved outwardly or inwardly on the frame 9 so that the clutch will be in a position to operate the rod 30 irrespective of the position assumed by the frame 17. It is also apparent that the telescopic connection of the shafts 23—23' will admit of the drum 24 being rotated from the shaft 23' regardless of the position of the frame 17.

Clamped on the upper end of a standard 36 is a horizontally disposed arm or bracket 37 which extends transversely across the machine and terminates above the belt B midway between the pulleys 2—2', in a vertically disposed tubular member or bushing 38. Mounted in the bushing 38 is a cylindrical casing 39 which has rack teeth formed on its side adapted to be engaged by gear teeth on a segment 40. The segment 40 is pivoted at 41 and has a lever handle connected thereto by means of which the segment may be rocked on its bearing to adjust the position of the casing 39 in the bushing 38. A thumb screw 42 on the segment lever extends through a slot on a bracket formed on the bushing 38 and is provided for the purpose of clamping the segment lever in a fixed position.

Mounted in the casing 39 is a plunger 43 on which is secured a stem 44 which extends upward through the top of the casing 39 and is guided therein. A spring 45 wound on the stem 44 between the top of the plunger 43 and the end of the casing 39 normally retains the plunger in its lowermost position, and forms a cushion against upward pressure on the plunger 43.

A cross-head or bracket 46 is rigidly mounted on the lower end of the plunger 43 through which upwardly extending threaded studs 47 on a shoe 48 extend; wing nuts 49 being screwed on the upper ends of the studs to clamp the shoe 48 against a knob formed on the underside of the crosshead 43. The shoe 48 normally contacts the upper surface of the belt B when the casing 37 is in its intermediate position.

In operation, the panel or board to be sanded is placed on the table 20 beneath the abrasive belt B and the level of the table is adjusted by the hand wheels 13 and their connections, to suit the thickness of the material to be worked. The frame 17 and the table 20 are then moved to the desired position in relation to the belt B and the shoe 48. The driving pulley 2' being then set in motion and the shoe 48 lowered upon the belt B, the latter is thrown into contact with the panel on the table 20 and is drawn thereacross by the rotation of the driving pulley 2'.

It is obvious that the area of working surface of the belt B will be that of the shoe 48, so that in handling a panel of considerable size it will be necessary to shift from side to side and longitudinally which is accomplished by operating the carriage 17 and the table 20, as before described, to bring the entire surface of the panel on the latter under the shoe 48.

A valuable feature of this machine is its adaptation for sanding thin veneers and finished panels and that in subjecting the panel to the action of the abrasive belt B, the edges and corners of the panel will not be rounded off, for the reason that the belt B slopes downward in passing under and away from the shoe 48 thereby confining the sanding action of the belt to the flat surface of the shoe 48. This feature is important inasmuch as the rounding of the edges and corners of veneered panels and the like is objectionable and which in most machines of this character cannot be avoided.

Having thus described my invention, what I claim and desire to secure by Letters Patent is—

1. In a sandpapering machine the combination with an endless abrasive belt and means for rotating the same of a vertically adjustable frame, a carriage movable on said frame transverse to the belt, a movable table on said carriage, and means on said carriage for moving the table parallel to the belt, said means including a transverse shaft, a winding drum thereon, a cable on the drum connected to the table, an auxiliary shaft parallel with the first shaft having a pair of spaced pulleys, and a clutch member between the pulleys for connecting either of the pulleys to the auxiliary shaft.

2. In a sandpapering machine, the combination, with an endless abrasive belt and means for rotating same, of a vertically adjustable frame, a carriage movable on said frame transverse to the belt, a movable table on said carriage, means on said carriage for moving said table parallel to said belt, said means embodying a tubular shaft, a drum thereon, and a cable wound on said drum and attached to said table, a shaft concentric with the first shaft, a pair of spaced loose pulleys on the first named shaft, and a clutch intermediate of the pulleys and shiftable to connect either of said pulleys with the second named shaft.

3. In a sandpapering machine, the combination, with an endless abrasive belt and means for rotating same, of a vertically adjustable frame, a carriage movable on said frame transverse to the belt, a movable table on said carriage, means on said carriage for moving said table parallel to said belt, said means embodying a tubular shaft, a drum thereon, a cable wound on said drum and attached to said table, means for rotating said drum and shaft embodying an auxiliary shaft slidable in and keyed to said tubular shaft, a pair of idler pulleys on said auxiliary shaft, a double faced clutch for connecting either of said pulleys to said shaft, and means for rotating said pulleys in opposite directions.

4. In a sandpapering machine, the combination, with an endless abrasive belt and means for rotating same, of a vertically adjustable frame, a carriage movable on said frame transverse to the belt, a movable table on said carriage, means on said carriage for moving said table parallel to said belt, said means embodying a tubular shaft, a drum thereon, a cable wound on said drum and attached to said table, means for rotating said drum and shaft embodying an auxiliary shaft slidable in and keyed to said tubular shaft, a pair of idler pulleys on said auxiliary shaft, a double faced clutch for connecting either of said pulleys to said shaft, means for rotating said pulleys in opposite directions, means for adjusting the abrasive belt, and means for depressing said belt toward said movable table.

5. In a sandpapering machine, the combination, with an endless abrasive belt and means for rotating same, of a vertically adjustable frame, a carriage movable on said frame transverse to the belt, a movable table on said carriage, means on said carriage for moving said table parallel to said belt, said means embodying a tubular shaft, a drum thereon, a cable wound on said drum and attached to said table, means for rotating said drum and shaft embodying an auxiliary shaft slidable in and keyed to said tubular shaft, a pair of idler pulleys on said auxiliary shaft, a double faced clutch for connecting either of said pulleys to said shaft, means for rotating said pulleys in opposite directions, means for adjusting the abrasive belt, and means for depressing said belt toward said movable table, said means embodying a yieldably mounted shoe and means for regulating the pressure of said shoe on said belt.

In testimony whereof I have hereunto set my hand in the presence of two subscribing witnesses.

JOHN W. KROEZE.

Witnesses:
 CHARLES EDELMAN,
 W. WHITE.

Copies of this patent may be obtained for five cents each, by addressing the "Commissioner of Patents, Washington, D. C."